United States Patent
Zaid et al.

(12) 
(10) Patent No.: US 6,213,214 B1
(45) Date of Patent: Apr. 10, 2001

(54) PIPELINE TREATMENT COMPOSITES

(75) Inventors: Gene H. Zaid, Sterling; Beth Ann Wolf, Hutchinson, both of KS (US)

(73) Assignee: Jacam Chemicals L.L.C.

( * ) Notice: Subject to any disclaimer, the term of this patent is extended or adjusted under 35 U.S.C. 154(b) by 0 days.

(21) Appl. No.: 09/253,111

(22) Filed: Feb. 19, 1999

Related U.S. Application Data

(63) Continuation-in-part of application No. 09/140,494, filed on Aug. 27, 1998, now Pat. No. 6,135,207.

(51) Int. Cl.$^7$ ............................. E21B 37/00; E21B 41/02; E21B 43/02

(52) U.S. Cl. .................... 166/309; 166/310; 166/311; 166/902; 252/180; 252/181; 507/90; 507/244; 507/261; 507/902; 507/904; 510/188

(58) Field of Search .......................... 137/13; 166/244.1, 166/309, 310, 311, 371, 902; 252/180, 181; 507/90, 244, 261, 902, 904; 510/188, 445

(56) References Cited

U.S. PATENT DOCUMENTS

| | | | | |
|---|---|---|---|---|
| 2,795,560 | * | 6/1957 | Williams | 507/902 X |
| 2,824,059 | * | 2/1958 | Chamot | 507/902 X |
| 2,833,712 | * | 5/1958 | Jones | 507/902 X |
| 2,927,078 | * | 3/1960 | Nathan | 507/90 |
| 3,076,508 | * | 2/1963 | Lissant | 166/309 |
| 3,219,115 | * | 11/1965 | Hower et al. | 166/309 X |
| 3,601,194 | * | 8/1971 | Gallus | 507/244 X |
| 3,630,953 | * | 12/1971 | Simon et al. | 507/90 X |
| 3,712,863 | * | 1/1973 | Bundrant et al. | 166/310 X |
| 3,756,949 | * | 9/1973 | Shreurs | 166/311 X |
| 3,776,248 | * | 12/1973 | Titus | 137/13 |
| 3,857,402 | * | 12/1974 | Schuh | 137/13 |
| 4,233,162 | * | 11/1980 | Carney | 507/244 X |
| 4,237,977 | * | 12/1980 | Lutener | 166/309 |
| 4,518,509 | * | 5/1985 | Newberry | 507/90 |
| 5,388,644 | * | 2/1995 | Romocki | 166/310 X |
| 5,515,924 | * | 5/1996 | Osterhoudt, III | 166/309 |
| 5,670,473 | * | 9/1997 | Scepanski | 510/445 |
| 5,858,957 | * | 1/1999 | Donoghue et al. | 510/445 |

OTHER PUBLICATIONS

Product Information Sheets for Lonza UNIHIB 106, UNIHIB 305LC and UNIHIB 906 (Undated).

Product Information Sheets for Baroid, BASF Iconel MP–100, Humko Kemamide, BASF Pluradyne C1 1010, C1 1019, Sherex Adogen 570S, Adogen 560, and Jacam WWT 1902C and WSI 3400 (Undated).

Product Information Sheet for Lonza UNIHIB 905 (Undated).

Technical Data Sheet for superphosphoric and polyphosphoric acids Technical Grade CAS No. 8017–16–1 (Undated).

* cited by examiner

*Primary Examiner*—George Suchfield
(74) *Attorney, Agent, or Firm*—Hovey, Williams, Timmons & Collins

(57) ABSTRACT

Solid, slowly dispersible well treatment composites are provided which have a sufficiently high melting point to prevent melting of the composite in hot weather. The composites have a low solubility and high specific gravity compared to prior art treatment agents; thus the composites readily sink in well and pipeline fluids and slowly release treatment ingredients over time, depending on the downhole and pipeline conditions. The composites include a nonylphenol ethoxylate having at least about 50 moles of ethylene oxide per mole of nonylphenol and a fatty acid amide having from 14–20 carbon atoms. Preferably, the composites further include a weighting agent and active ingredients selected from the group consisting of corrosion inhibitors, scale inhibitors, bactericides, scale converters, foaming agents, and mixtures thereof. In one embodiment, the composites are spherical in shape and are passed through pipelines for maintenance and treatment of the pipelines.

22 Claims, No Drawings

PIPELINE TREATMENT COMPOSITES

This application is a continuation in part of U.S. patent application Ser. No. 09/140,494 filed on Aug. 27, 1998 now U.S. Pat. No. 6,135,207.

BACKGROUND OF THE INVENTION

1. Field of the Invention

The present invention is broadly concerned with solid, high specific gravity, low solubility well treatment composites used for oil and gas well and pipeline treatments. More particularly, the composites of the invention have a high melting point, thus eliminating the problem of ambient air melting, are sufficiently dense so as to readily sink in typical well fluids, and have a low solubility that generates a slow release of the composite ingredients into well or pipeline fluids. The composites of the invention preferably comprise a nonylphenol ethoxylate and a fatty acid amide, and also further include a weighting agent such as barium sulfate, sodium chloride, or sodium bicarbonate, and active ingredients selected from the group consisting of corrosion inhibitors, scale inhibitors, bactericides, scale converters, foaming agents, and mixtures thereof. In one embodiment, the composites are formed into spherical bodies having a maximum surface-to-surface dimension of about 2 inches for use in treating and maintaining oil and gas pipelines.

2. Description of the Prior Art

Oil and gas wells and pipelines require the periodic addition of treatment agents, such as scale and corrosion inhibitors, in order to facilitate smooth, trouble-free operations. In wells, such agents are often in liquid form, and are commonly added into the annular space between the well sidewall and the internal well casing. Well operators use a number of expedients for such additions, such as introduction through a side arm flush associated with the well fluid removal system. Because conventional treating agents tend to float on the well fluid, it is a common practice to add excess well fluid after addition of the treatment agent in order to drive the agent downwardly to a subterranean level adjacent the lower end of the well casing. As can be appreciated, this practice largely or completely shuts down well production, and it is not uncommon to thereby lose an entire day's production during the treatment process.

The foregoing difficulty is particularly acute in the case of low fluid wells having a relatively low static fluid level, in that relatively large amounts of fluid must be added atop the agent in order to drive the agent down to an operative level. However, the problem can also be significant in high fluid wells, because of the need to drive the active chemical downwardly through relatively long columns of fluid. Indeed, it is sometimes impossible in such situations to drive the chemical down far enough into the well formation, and the chemical may be significantly diluted before it reaches the downhole pump.

Weighted treatment agents have been used in the past in an effort to overcome this problem. These materials are in fluid form, but include glycerine or molasses in order to give the fluid a higher specific gravity. Unfortunately, this tends to be an expensive process, and such weighting agents have a tendency to adhere to the outside of the well tubing and casing.

Solid composites have also been utilized to provide a method for downhole treatment. For example, mold inhibitors such as the commercial product Iconol NP-100 Pastille FD (a nonylphenol ethoxylate available from BASF Corp.) have been mixed with active ingredients (such as corrosion inhibitors or bactericides) and formed into pellets. The melting point of NP-100 is approximately 69° C. However, when the active ingredients are added to NP-100 and the mixture is formed into pellets, the melting point of the entire pellet composite is only about 54° C. This results in pellets which melt easily in hot weather and dissolve quickly downhole.

Oil and gas pipelines typically span for hundreds of miles underground from the oil or gas source to various points of delivery. Treating and maintaining these pipelines is particularly critical as repairs are difficult and costly. If a portion of a pipeline is corroded or if flow is being impeded by scale build-up, pipeline operators must first locate the problem area. Once the problem is located, the ground around that section of the pipeline must be excavated and the pipeline repaired or replaced. This shuts down oil and gas delivery for some time and is particularly problematic when the problem area is located under an urban area or in an isolated area such as a dessert.

SUMMARY OF THE INVENTION

The present invention overcomes the problems noted above, and provides solid well treatment composites having a specific gravity greater than typical well fluids, thus causing the composites to sink in well fluids. The composites of the invention do not melt in ambient air during hot weather and dissolve slowly over the course of several weeks after downhole placement, depending on the downhole conditions. Furthermore, because the composites melt slowly, they can be used to treat and maintain long stretches of pipelines.

More particularly, the composites of the invention comprise a nonylphenol ethoxylate having at least about 50 moles, and preferably from about 50–150 moles of ethylene oxide per mole of nonylphenol, and a fatty acid amide. The nonylphenol ethoxylate component should be present in the composites at a level of from about 20 to about 75%, preferably from about 25 to about 60%, and more preferably from about 30 to about 50% by weight, based on the total weight of the composite. A particularly preferred nonylphenol ethoxylate having about 100 moles of ethylene oxide per mole of nonylphenol is available from BASF under the tradename Iconol NP-100 Pastille FD.

The fatty acid amide should be present in the composites at a level of from about 20 to about 75%, preferably from about 25 to about 60%, and more preferably from about 30 to about 50% by weight based on the total weight of the composite. The preferred fatty acid amides are those having 14–20 carbon atoms, with fatty acid amides having 18 carbon atoms being particularly preferred. One particularly preferred 18 carbon atom fatty acid amide is oleamide (an unsaturated fatty monoamide derived from oleic acid and having the formula cis-$CH_3(CH_2)_7CH{:}CH(CH_2)_7CONH_2$). Oleamide is commercially available under the tradename KEMAMIDE® from the Humko Chemical Division of the Witco Corp. in Memphis, Tenn.

In the composites of the invention, the ratio of nonylphenol ethoxylate:fatty acid amide should be from about 1:3 to 3:1, preferably from about 0.5:1 to 1.2:1, and more preferably about 1:1.

In one embodiment, the composites further include active ingredients selected from the group consisting of corrosion inhibitors, scale inhibitors, bactericides, scale converters, foaming agents, and mixtures thereof While the concentration of each active ingredient can be altered as desired, the total concentration of all active ingredients should be from about 10 to about 50% by weight, preferably from about 20 to about 40% by weight, and more preferably from about 28 to about 30% by weight based on the total weight of the composite.

While any corrosion inhibitor known in the art is suitable with the composites of the invention, particularly preferred corrosion inhibitors include tallow diamine ethoxylates (such as Pluradyne® Cl 1010 from BASF), irnidazolines (such as Pluradyne® Cl 1019 from BASF), and tallow-1,3-propylene diamines (such as Adogen® 570 S from Sherex Chemical Co. in Dublin, Ohio). Any bactericide known in the art will work with the composites of the invention, but preferred bactericides include coco diamines (such as Adogen® 560 from Sherex Chemical Co.) and 3-alkoxy(12-15)-2-hydroxy-N-propyltrimethyl ammonium chloride (available under the name WWT 1902C from JACAM Chemical Partners, Ltd., Sterling, Kans.). The preferred scale inhibitors of the composites include polyacrylates, phosphate esters such as WSI 3400 (JACAM Chemical Partners, Ltd.), and organic phosphonates such as Unihib 106 (LONZA, Inc., Fair Lawn, N.J.), Unihib 305LC (LONZA, Inc.), and Unihib 905 (LONZA, Inc.). These organic phosphonates can also function as a corrosion inhibitor as discussed above.

In another embodiment, the composites further include a weighting agent such as sodium bicarbonate, powdered NaCl, or barium sulfate. One preferred barium sulfate weighting agent is BAROID® available from NL Baroid/NL Industries, Inc. in Houston, Tex. The weighting agent should be present in the composites at a concentration of from about 5 to about 35%, preferably from about 10 to about 30%, and more preferably from about 13 to about 17% by weight based on the total weight of the composite.

The composites in accordance with the invention have a specific gravity of at least about 1.16, preferably about 1.19–1.35, and more preferably about 1.2–1.3. It will be appreciated that because the specific gravity of the composites is greater than that of the well fluid, the composites will readily sink into the well fluid to a level adjacent or below the lower end of the well casing. Furthermore, the mixture of a nonylphenol ethoxylate and a fatty acid amide unexpectedly provides a well treatment pellet with an increased melting point. Particularly, the composites have a melting point of at least about 75° C., preferably at least about 78° C., and more preferably at least about 88° C. in order to prevent the composites from melting in hot weather. The composites dissolve in approximately 2–4 weeks, depending on the downhole temperature, rather than dissolving in 4–24 hours as is the case with currently available well agent treatments. Finally, the composites are preferably formed into pellets wherein the largest surface dimension of the pellets average from about 75 to about 750 mm, and more preferably from about 100 to about 500 mm.

In another embodiment, the composites are formed into larger bodies wherein the largest surface dimension of the body averages from about 0.25–8.0 inches, and preferably about 1.75–2.25 inches. The bodies are preferably essentially spherical and are useful for treating oil and gas pipelines. The bodies can be placed in the pipeline and allowed to travel through the pipeline with the oil or gas. Because the bodies generally take about 2 days to completely dissolve, they can be used to treat and maintain many miles of pipeline with relative ease.

The composites are formed by mixing a quantity of melted nonylphenol ethoxylate with a quantity of melted fatty acid amide in the concentration ranges and ratios previously described. Alternately, the two solid compounds can be mixed together and the resulting mixture can be melted by heating to about 88–95° C. The desired active ingredients (corrosion inhibitors, scale inhibitors, bactericides, scale converters, foaming agents, and mixtures thereof) are then added to the melted mixture followed by stirring for approximately 15 minutes. The chosen active ingredients and their concentrations can be varied depending on the condition of the well to be treated. However, the total concentration of all active ingredients should be such that it falls within the ranges set forth above.

After mixing, the desired weighting agent should be added to the mixture followed by further mixing until a substantially homogeneous mixture is obtained. The hot material is then poured into a belt mold or ball mold and allowed to cool, forming pellets of the desired size and shape. The finished pelleted composites can then be used immediately or packaged for later use.

Any known method of introducing a treatment agent into a well or pipeline is suitable for treating wells and pipelines using the composites of the invention. Advantageously, the most preferred introduction method is simply dropping the composites into the well or pipeline fluid. Because they have a specific gravity of at least about 1.16, the composites readily sink into the fluid and slowly dissolve over the course of several weeks.

DETAILED DESCRIPTION OF THE PREFERRED EMBODIMENT

The following examples illustrate preferred aspects of the present invention. It is to be understood, however, that these examples are presented by way of illustration only, and nothing therein should be taken as a limitation upon the overall scope of the invention.

EXAMPLE 1

One hundred pounds of Iconol NP-100 Pastille FD (a nonylphenol ethoxylate having about 100 moles of ethylene oxide per mole of nonylphenol, available from BASF) was melted by heating to about 75° C. Likewise, 100 pounds of KEMAMIDE® (available from Witco Corp., Humko Chemical Division, Memphis, Tenn.) was melted by heating to about 85° C. The two melted compounds were mixed together, and the following compounds were added to the mixture:

| Compound | Amount (in pounds) |
| --- | --- |
| Pluradyne ® Cl1010 (corrosion inhibitor) | 40 |
| Pluradyne ® Cl1019 (corrosion inhibitor) | 50 |
| WWT 1902C (3-Akoxyl(12–15)-2-hydroxy-N-propyltrimethyl ammonium chloride, a bactericide) | 40 |
| WSI 3400 (a phosphate ester scale inhibitor) | 40 |
| Unihib 106 (an organic-phosphonate scale inhibitor) | 50 |

The resulting mixture was mixed for 15 minutes followed by the addition of 45 pounds of BAROID® (barium sulfate weighting material), flour, salt, or sodium bicarbonate. Mixing was continued until a substantially homogeneous dispersion was obtained. The hot material was then poured into belt molds where it was cooled. The resulting pellets were removed from the molds and packaged. Tests conducted on the final product showed that the pellets had a specific gravity of 1.3 and a melting point of 70–74° C.

EXAMPLE 2

One hundred pounds of Iconol NP-100 Pastille FD was mixed with 100 pounds of KEMAMIDE®. The mixture of two solids was melted by heating to about 85° C. To the melted mixture, the following compounds were added:

| Compound | Amount (in pounds) |
|---|---|
| Pluradyne ® Cl1010 | 60 |
| WWT 1902C | 60 |
| WSI 3400 | 60 |
| Adogen ® 580 (a coco diamine bactericide) | 40 |
| Unihib 305LC (an organic-phosphonate scale inhibitor) | 60 |

The resulting mixture was mixed for 15 minutes followed by the addition of 45 pounds of BAROID®. Mxing was continued until a substantially homogeneous dispersion was obtained. The hot material was then poured into belt molds where it was cooled. The resulting pellets were removed from the molds and packaged. Tests conducted on the final product showed that the pellets had a specific gravity of 1.3 and a melting point of 68–72° C.

We claim:

1. An oil as gas pipeline as downhole treatment composite comprising a solid, self-sustaining body having respective quantities of a nonylphenol ethoxylate having at least about 50 moles of ethylene oxide per mole of nonylphenol, and a fatty acid amide having 14–20 carbon atoms, said body's largest surface dimension being from about 0.25–8.0 inches.

2. The composite of claim 1, said nonylphenol ethoxylate being present at a level of from about 20 to 75% by weight based on the total weight of the composite.

3. The composite of claim 1, said fatty acid amide being present at a level of from about 20 to 75% by weight based on the total weight of the composite.

4. The composite of claim 1, said fatty acid amide being oleamide.

5. The composite of claim 1, said composite further comprising a compound selected from the group consisting of corrosion inhibitors, scale inhibitors, bactericides, scale converters, foaming agents, and mixtures thereof.

6. The composite of claim 1, said composite having a specific gravity of at least about 1.16.

7. The composite of claim 1, said composite having a melting point of at least about 75° C.

8. The composite of claim 1, said composite further including a weighting agent.

9. The composite of claim 8, said weighting agent being selected from the group consisting of barium sulfate, sodium chloride, and sodium bicarbonate.

10. The composite of claim 1, said dimension being from about 1.75–2.25 inches.

11. The composite of claim 1, said composite being essentially spherical.

12. A method of treating a pipeline or well comprising the steps of:

providing a pipeline or downhole treatment composite comprising a solid, self-sustaining body including a nonylphenol ethoxylate having at least about 50 moles of ethylene oxide per mole of nonylphenol, and a fatty acid amide having 14–20 carbon atoms, said body's largest surface dimension being from about 0.25–8.0 inches; and introducing said composite into said pipeline or well.

13. The method of claim 12, said nonylphenol ethoxylate being present at a level of from about 20 to about 75% by weight based on the total weight of the composite.

14. The method of claim 12, said fatty acid amide being present at a level of from about 20 to about 75% by weight based on the total weight of the composite.

15. The method of claim 12, said fatty acid amide being oleamide.

16. The method of claim 12, said composite further comprising a compound selected from the group consisting of corrosion inhibitors, scale inhibitors, bactericides, scale converters, foaming agents, and mixtures thereof.

17. The method of claim 12, said composite having a specific gravity of at least about 1.16.

18. The method of claim 12, said composite having a melting point of at least about 75° C.

19. The method of claim 12, said composite further including a weighting agent.

20. The method of claim 12, said largest surface dimension being from about 1.75–2.25 inches.

21. The method of claim 12, said composite being essentially spherical.

22. The method of claim 12, further including the step of passing said composite through at least a portion of said pipeline after said introducing step.

* * * * *